March 31, 1925.
W. H. KRUG
COUPLING MEMBER FOR TIRE CHAINS
Filed July 30, 1920
1,531,295
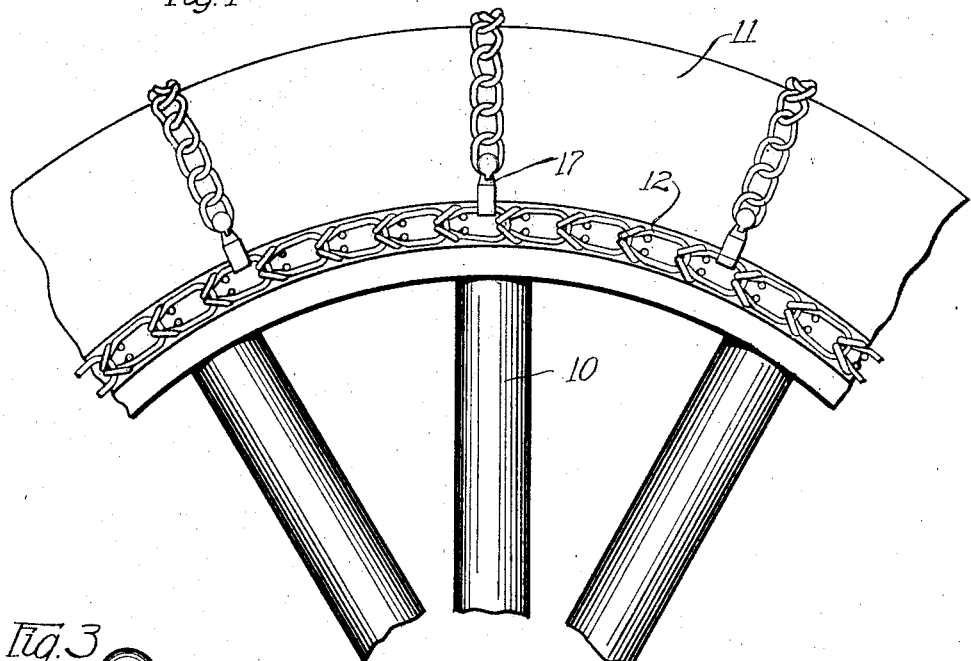
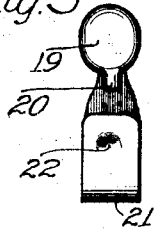
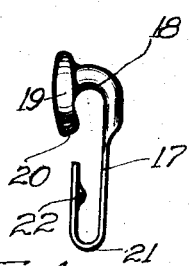
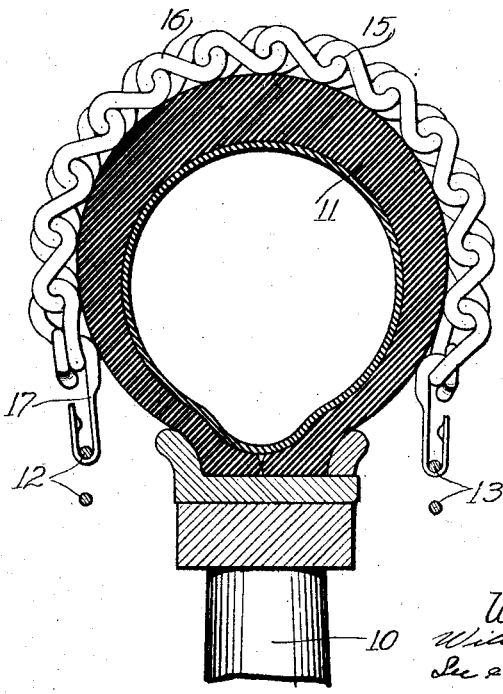
Inventor:
William H Krug Patented Mar. 31, 1925.

1,531,295

UNITED STATES PATENT OFFICE.

WILLIAM H. KRUG, OF FOND DU LAC, WISCONSIN.

COUPLING MEMBER FOR TIRE CHAINS.

Application filed July 30, 1920. Serial No. 400,115.

*To all whom it may concern:*

Be it known that I, WILLIAM H. KRUG, a citizen of the United States, and resident of Fond du Lac, in the county of Fond du Lac and State of Wisconsin, have invented a certain new and useful Improvement in Coupling Members for Tire Chains, of which the following is a full, clear, concise, and exact description, reference being had to the accompanying drawings, forming a part of this specification.

My invention relates to tire chains adapted to prevent skidding of vehicles to which chains are attached and more particularly to that class of tire chains wherein the cross chain sections or treads are independently removable. In this class of tire chains in the event that one tread section becomes broken it is only necessary to insert a new section in its place whereas in the ordinary type of chain complete removal is necessary to avoid having the broken portions strike the automobile fenders on each revolution of the wheel. While the use of tire chains having readily removable treads eliminates the necessity for the entire removal of the chains in the event of breaking a cross chain section, difficulty has been encountered by the failure to provide suitable coupling means for attaching the cross chain sections to the so-called rim chains or retaining means. To produce a satisfactory arrangement of this kind, it is necessary that the coupling member be one of substantial construction, one that is easily attached and one that will not become disengaged from its position by the slipping and vibrations that occur while the associated wheel is rotating.

It is, therefore, an object of my invention to provide a coupling member that is strongly and cheaply constructed, one that permits of the use of independent cross chain sections and enables the operator to adjust them quickly and easily, and further to provide a coupling member that will not permit disengagement of the cross chain sections from the rim chain sections due to the vibrations of the several parts while in use.

Referring to the drawings,

Figure 1 is a fragmentary side elevation of an automobile wheel provided with a tire chain embodying my invention.

Figure 2 is a sectional view of the arrangement shown in Figure 1, and

Figures 3 and 4 are respectively front and side elevational views of the coupling member of my invention.

Similar characters of reference refer to similar parts throughout the several views.

Referring to the drawings, 10 indicates an automobile wheel having a tire 11 and provided with tire chains. Rim chain sections are shown at 12 and 13 and extend on opposite sides of the tire and have their opposite ends connected by suitable means not shown. The cross chain sections are illustrated at 15 consisting of links 16 of sufficient size and suitable proportions to permit of the insertion of the coupling members of my invention which, in turn, are connected to the rim chain sections or retaining means to hold the cross chain sections in the proper place. I prefer to drop forge the coupling member which is illustrated at 17 and comprises a member having a neck 18, an enlarged head 19, a projection 20 at one end, and a hook portion 21 at the other end. The hook portion 21 is of thinner conformation to provide a spring hook. In the region of the free end of the hook is an inwardly extending projection 22 which provides means for retaining the hook in its proper position when attached to the rim chain section. The member 17 is threaded through the end link member of the cross chain section 15 by first inserting the hook portion 21 until the neck 18 of the coupling member and the enlarged head 20 engages the chain and the hook portion extends downwardly. The head 19 is, of course, of sufficient size to prevent its passing through the opening in the chain link. The hook member is then connected with the rim chain sections and by reason of the projection 22 accidental disengagement of the hook member from the rim chain section is prevented, as the projection 22 makes considerable directed effort necessary to disconnect the hook from the chain. In applying the tire chains to an automobile wheel, the rim chain sections will be given slack by disconnecting the opposite ends and after the several cross chain sections have been given the proper position, these ends are brought together and connected by suitable means not shown. The portion 20 of the head 19 may then be hammered inwardly to embrace the end link of the cross chain section and to hold the coupling member in its proper position.

I have found that the coupling member 17 is satisfactorily and conveniently made by drop forging, providing the head, neck and stem portion and the projection 22 may be formed in the same or a separate operation. While still soft or after reheating the stem portion, the same is bent upon itself to form the hook 21 which is immediately tempered to provide the necessary spring.

Having thus described my invention, what I claim is new and desire to secure by United States Letters Patent is:—

1. A coupling member for anti-skidding devices having a cross chain section and retaining means, said coupling member being adapted to be threaded through the cross chain section and having an enlarged head arranged to engage the cross chain section, said enlarged head being arranged to be bent to embrace the cross chain section, said coupling member having a bent spring portion thinner than the remaining portions to form a hook adapted to embrace the retaining means, and means carried by the hook to prevent its removal.

2. A coupling member for anti-skidding devices having a cross chain section and retaining means, said coupling member being adapted to be threaded through the cross chain section and having an enlarged head arranged to engage the cross chain section, said coupling member having a bent spring portion thinner than the remaining portions to form a hook adapted to embrace the retaining means, and means carried by the hook to prevent its removal.

3. A drop forged coupling member for chain links, comprising a neck, a head portion, said head being adapted to be bent to embrace one of said chain links, the coupling member away from said neck and head portion being flat and of thinner cross section and bent to form a hook, said hook being formed to present a retaining means.

4. A drop forged coupling member for chain links, comprising a neck, a head portion, the coupling member away from said neck and head portion being flat and of thinner cross section and bent to form a hook, said hook being formed to present a retaining means.

5. A drop forged coupling member for chain links, comprising a neck, a head portion, the coupling member away from said neck and head portion being flat and of thinner cross section and bent to form a hook.

6. A drop forged coupling member for chain links, comprising a neck portion, the coupling member away from said neck portion being of thinner cross section and bent to form a spring hook.

7. A coupling member for chain links comprising a neck and retaining portions, the coupling member away from said neck and retaining portions being of thinner cross section and bent to form a hook.

In witness whereof, I hereunto subscribe my name this 26th day of July, 1920.

WILLIAM H. KRUG.

Witnesses:
H. B. OSGOOD,
OTTO H. KAUFMAN.